United States Patent
Heusermann et al.

(10) Patent No.: US 9,317,581 B2
(45) Date of Patent: *Apr. 19, 2016

(54) CATEGORIZING AN OBJECT (71) Applicant: SAP SE, Walldorf (DE)

(72) Inventors: Knut Heusermann, Bad Schoenborn (DE); Juan Carlos Martinez, Madrid (ES); Ingo Bruss, Heidelberg (DE); Christiane Kuntz-Mayr, Limburgerhof (DE)

(73) Assignee: SAP SE, Walldorf (DE)

( * ) Notice: Subject to any disclaimer, the term of this patent is extended or adjusted under 35 U.S.C. 154(b) by 0 days.

This patent is subject to a terminal disclaimer.

(21) Appl. No.: 14/512,824

(22) Filed: Oct. 13, 2014

(65) Prior Publication Data

US 2015/0032755 A1    Jan. 29, 2015

Related U.S. Application Data (63) Continuation of application No. 10/929,832, filed on Aug. 30, 2004, now Pat. No. 8,862,578.

(51) Int. Cl.
*G06F 17/30* (2006.01)
*H04L 29/08* (2006.01)

(52) U.S. Cl.
CPC .... *G06F 17/30598* (2013.01); *G06F 17/30643* (2013.01); *G06F 17/30943* (2013.01); *H04L 67/10* (2013.01)

(58) Field of Classification Search
CPC .................................................. G06F 17/30643
USPC ......................................................... 707/731
See application file for complete search history.

(56) References Cited

U.S. PATENT DOCUMENTS

| | | | |
|---|---|---|---|
| 6,675,161 B1 * | 1/2004 | Suchter ............. | G06F 17/30873 707/5 |
| 6,701,333 B2 | 3/2004 | Suermondt et al. | |
| 6,859,810 B2 * | 2/2005 | Andrei ................ | G06F 17/3092 707/102 |
| 7,020,659 B2 * | 3/2006 | Yorke ................. | G06F 17/3041 707/102 |
| 8,862,578 B2 | 10/2014 | Heusermann et al. | |
| 2003/0110177 A1 | 6/2003 | Andrei et al. | |
| 2003/0195937 A1 | 10/2003 | Kircher, Jr. et al. | |

(Continued)

OTHER PUBLICATIONS

European Communication pursuant to Article 96(2) European Patent Office, (Jun. 1, 2006), 6 pgs.

(Continued)

*Primary Examiner* — Apu Mofiz
*Assistant Examiner* — Chelcie Daye
(74) *Attorney, Agent, or Firm* — Schwegman Lundberg & Woessner, P.A.

(57) ABSTRACT

An object may be categorized upon distribution of the object from a sender system to a recipient system. The object may be assigned to at least one recipient category in a recipient category hierarchy according to a first predefined mapping from a sender category hierarchy to the recipient category hierarchy. The object is initially assigned to a sender category in the sender category hierarchy. There is applied to the object a second predefined mapping from the recipient category hierarchy to the sender category hierarchy. It is determined whether the first and second predefined mappings converge. If the first and second predefined mappings do not converge, there may be executed a rule-based reassignment algorithm to make the first and second predefined mappings converge.

19 Claims, 5 Drawing Sheets

(56) References Cited

U.S. PATENT DOCUMENTS

2004/0158567 A1     8/2004    Dettinger et al.
2006/0059157 A1     3/2006    Heusermann et al.

OTHER PUBLICATIONS

"U.S. Appl. No. 10/929,832, Appeal Decision mailed Mar. 13, 2014", 7 pgs.

"U.S. Appl. No. 10/929,832, Final Office Action mailed Feb. 23, 2010", 13 pgs.

"U.S. Appl. No. 10/929,832, Final Office Action mailed Dec. 2, 2008", 12 pgs.

"U.S. Appl. No. 10/929,832, Non Final Office Action mailed Jun. 19, 2008", 18 pgs.

"U.S. Appl. No. 10/929,832, Non-Final Office Action mailed Jun. 2, 2009", 13 pgs.

"U.S. Appl. No. 10/929,832, Non-Final Action mailed Aug. 31, 2007,", 14 pgs.

"U.S. Appl. No. 10/929,832, Notice of Allowance mailed Jun. 9, 2014,"6 pgs.

"U.S. Appl. No. 10/929,932, Response file Jan. 8, 2008 to final Office Action mailed Dec. 2, 2008", 11 pgs.

"U.S. Appl. No. 10/929,832, Response filed Mar. 25, 2009 to Advisory Action mailed Jan. 27, 2009", 10 pgs.

"U.S. Appl. No. 10/929,832, Response filed Aug. 19, 2009 to Non Final Office Action mailed Jun. 2, 2009", 12 pgs.

"U.S. Appl. No. 10/929,832, Response filed Sep. 16, 2008 to Non Final Office Action mailed Jun. 19, 2008,", 11 pgs.

"U.S. Appl. No. 10/929,832, Response filed Mar. 17, 2008 toFinal Office Action mailed Jan. 22, 2008", 9 pgs.

"U.S. Appl. No. 10/929,832, Response filed Apr. 21, 2008 to Final Office Action mailed Jan. 22, 2008", 9 pgs.

"U.S. Appl. No. 10/929,832, Final Office Action mailed Jan. 22, 2008", 13 pgs.

"U.S. Appl. No. 10/929,832, Response filed Nov. 28, 2007 to Non-Final Office Action mailed Aug. 31, 2007", 10 pgs.

"Matching Processes", http://help/sap/com/saphelp_mdm200, (Jul. 21, 2004), 5 pgs.

Aberer, Karl, et al., "A Framework for Semantic Gossiping"SIGMOD Record, vol. 31 (4), XP002342214, (Dec. 2002), 48-53.

Doan, Anhai, et al., "Learning to Match Ontologies on the Semantic Web", The VLDB Journal, vol. 12 (4), Heidelberg, Germany, XP002342177, (2003), 303-319.

Hameed, Adil., et al., "Ontology Reconciliation", Handbook on Ontologies, Heidelberg, Germany, XP002341365, (Jan. 2004), 231-250.

Noy, Natalya F., et al., "Anchor-PROMPT: Using Non-Local Context for Semantic Matching", Working on Ontologies and information Sharing at IJCAI-2001: http://www-agki.tzi.de/buster/IJCAIwp/Final/noy.pdf. XP002342176, (2001).

Noy, Natalya F., "Tools for Mapping and Merging Ontologies", Handbook on Ontologies, Heidelberg, Germany, XP002341366, (Jan. 2004), 231-250.

Rahm, Edward, et al., "A Survey of Approaches to Automatic Schema Matching", The VLDB Journal, vol. 10, Heidelberg, Germany, XP002263938, (Nov. 21, 2001), 334-350.

\* cited by examiner

CATEGORIZING AN OBJECT

CROSS-REFERENCE TO RELATED APPLICATIONS

This application is a continuation of prior U.S. application Ser. No. 10/929,832, filed on Aug. 30, 2004, which is incorporated by reference herein in its entirety.

TECHNICAL FIELD

This description relates to categorizing an object upon distribution of the object from a sender system to a recipient system.

BACKGROUND

Computer systems can include data objects that correspond to products, technical assets, contacts, partners or other tangibles. Such objects may be assigned to one or more categories in the computer system to indicate properties of the data object. For example, a data object that corresponds to a vehicle may be assigned to a category "trucks". Categories may be arranged in hierarchies;

for example, the category "trucks" may have a subcategory, or specialization, that is called "light trucks".

Objects may be transferred from one computer system to another. For example, an object that is created in one system may be temporarily transferred to a second system for a specific purpose. The transfer may correspond to a physical relocation of the tangible item to which the object corresponds. For example, when a technical asset is brought from one country to the next, the object may be distributed to a computer system that is associated with, and optionally located in, the new country. The object may be updated while in the new system, for example if work is being done on the technical asset, and the updated object may thereafter be passed back to the first system.

The handling of the object in a computer system may be affected by the system architecture. Moreover, the two (or more) computer systems that handle the object may have different architectures. Particularly, the systems may have different categories or category hierarchies to which objects in the respective systems should be assigned. For example, the system that sends the data object may have N number of categories, including a category "cars" with specializations for different car brands. The recipient system, in turn, may have M number of categories, including a category "vehicles" (covering not only cars) with specializations for two-wheel and four-wheel driven vehicles.

The difference in categories can present challenges when distributing an object between the systems. For example, all cars are vehicles but not every vehicle is a car. This means that every object assigned to a vehicles category cannot be automatically assigned to a cars category because some of the vehicle category objects may not be cars. Accordingly, it may not generally be possible to perform a one-to-one (or 1×1) mapping between categorizations in these systems, because this would assume that the category hierarchies are the same and have the same meaning. Rather, it may be necessary to perform a N×M mapping.

Building a N×M mapping is time consuming and may lead to inconsistencies. Particularly, there may be a lack of convergence in the mapping.

That is, if a category in the sender system is mapped to a category in the recipient system and, upon inverting the mapping back to the sender system again, the inverse mapping does not target the specific sender category but rather another category, the mapping may lack convergence.

Existing systems also have used 1×N directed key mappings that involve using a mapping profile that provides a process for mapping authorizations. The mapping process includes criteria for matching data objects to each other for the mapping. For example, such mappings are implemented in the Master Data Management 2.0 product available from SAP AG in Walldorf (Baden), Germany. One disadvantage with this solution is that it does not provide an automatic categorization during a distribution process without user interaction.

SUMMARY

The invention relates to categorizing an object.

In a general aspect, a method comprises assigning an object to at least one recipient category in a recipient category hierarchy according to a first predefined mapping from a sender category hierarchy to the recipient category hierarchy. The object has been assigned to a sender category in the sender category hierarchy. The method comprises applying to the object a second predefined mapping from the recipient category hierarchy to the sender category hierarchy. The method comprises determining whether the first and second predefined mappings converge.

In selected embodiments, when the first and second predefined mappings do not converge, the method further comprises executing a rule-based reassignment algorithm to make the first and second predefined mappings converge.

The rule-based reassignment algorithm may comprise determining whether there exists an object-specific category in the recipient category hierarchy that is a specialization of the recipient category.

The rule-based reassignment algorithm may comprise determining whether the object is assigned to two recipient categories at different levels of the recipient category hierarchy. The object may be assigned to one selected from the group consisting of: a more general category of the two recipient categories and a less general category of the two recipient categories.

The rule-based reassignment algorithm may comprise determining whether the object is assigned to several first-level specialization categories of a specific recipient category. If it is determined that the object is assigned to the several first-level specialization categories, the object may be assigned to the specific recipient category.

Advantages of the systems and techniques described herein may include any or all of the following: Providing an improved categorization of an object; providing a categorization that is consistent between systems having different categories and different category hierarchies; providing an automatic categorization during a distribution process without user interaction; improving object sharing between systems; facilitating more convenient connection of systems having different architectures; and reducing the need for user input due to incorrect object categorization.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

Like reference numerals in the various drawings indicate like elements.

DETAILED DESCRIPTION

Figure 1:
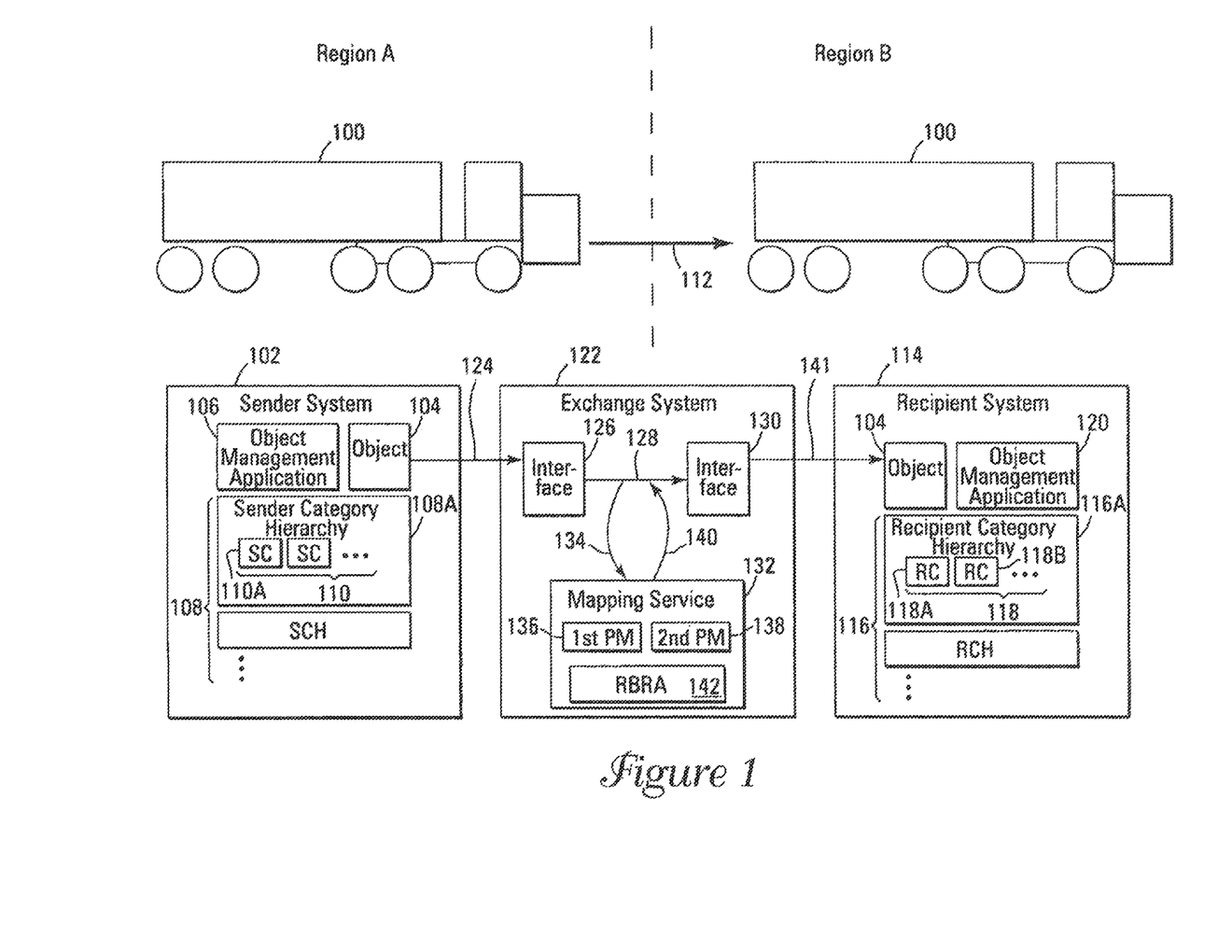
FIG. 1 schematically shows a truck traveling between regions and computer systems that handle a corresponding object.

FIG. 1 shows a truck 100 that belongs to an organization. The organization runs a sender system (SS) 102 that, among other things, includes an object 104 corresponding to the truck 100. That is, the organization may use the SS to track the whereabouts of the truck 100 and to document important information about it. The SS may include an object management application 106 by which operations on the object 104 can be performed. The SS includes at least one sender category hierarchy (SCH) 108. For example, the object may be assigned to at least one sender category (SC) 110 in one of the SCHs. In some implementations, the SS may include a Master Data Management system, available from SAP AG in Walldorf (Baden), Germany.

Assume that the truck 100 is currently in Region A. This may be reflected by the fact that the object 104 is located in the SS. In the course of business, the truck travels from Region A to Region B as indicated by an arrow 112. The Region B may be a different state or country, to name just two examples. In Region B the truck malfunctions and requires service. It is therefore brought to a subsidiary of the owner organization where it is attended by a mechanic. Information about the repair should be recorded, and the object 104 may therefore be transferred to the RS, as will now be described.

The subsidiary operates a recipient system (RS) 114 which is different from the SS 102. For example, the RS 114 may have a different architecture than the SS 102. Particularly, the RS includes at least one recipient category hierarchy (RCH) 116 which includes recipient categories (RC) 118. The RS includes an object management application 120 that allows operations to be performed on the object 104 in the RS. The object management application 120 differs from the application 106 at least in the sense that it requires the object(s) to be assigned to a category within the RCH 116. In some implementations, the RS may include an R/3 system, available from SAP AG in Walldorf (Baden), Germany.

The object 104 is passed through an exchange system (ES) 122 to assign it to one or more of the RCs in the RS. In some implementations, the ES may include an Exchange Infrastructure system, an integration broker available from SAP AG. In some implementations, the SS is located in Region A, the RS is located in Region B and the ES may be located in either region or incorporated in either or both of them. In other implementations, the SS and RS may be located in the same region.

The SS passes the object 104 to the ES 122 as indicated by an arrow 124. The ES may include known system interfaces. For example, a first interface 126 may define an import format that includes a document including extensible markup language (XML) code. The processing in the ES is schematically represented by an arrow 128. Moreover, the ES also may include a second interface 130 that defines an export format that includes an Intermediate Document (IDoc), which is an SAP document format.

During the processing 128, the ES may call a mapping service 132 to perform one or more mappings between respective categories in the SCH and the RCH. The call is schematically represented by an arrow 134. The call 134 identifies the SCs to which the object 104 presently is assigned.

In response to the call 134, the mapping service 132 performs a first predefined mapping (PM) 136 from the at least one SCH to at least one RCH. The PM may include several 1×M mapping blocks, each of which upon execution maps one of the SCs in a SCH to one or more of the RCs. For example, a 1×M mapping block may map a first SC 110A that is part of a first SCH 108A to an RC 118A and an RC 118B in RCH 116A.

The mapping service 132 also includes a second PM 138 from at least one RCH to at least one SCH. While the second PM can conceptually be considered an inverse to the first PM, it is noted that an unambiguous inverse mapping of the first PM may not exist. For example, every object categorized as a "vehicle" cannot be automatically mapped to a "cars" category because one or more of the vehicle objects may not be a car. Thus, the second PM can include several 1×N mapping blocks, each of which upon execution maps one of the RCs in the RCH to one or more of the SCs.

Because of the differences between the SCH and the RCH, it should not be assumed that sequentially applying the first PM and the second PM is a convergent process. That is, by reason of how the first and second PMs are created, the second PM may constitute a poor inverse of the first PM, and the object may end up being assigned to a different SC in the SS than it started out with. Should the process thereafter be repeated (with another mapping to the RS and back), the miscategorization may continue and valuable information about the object may be lost. Accordingly, the categorization may follow an unpredicted path that does not return to its beginning This can be considered a divergence of the mapping.

The ES therefore determines whether the first and second PM are convergent for the object 104. That is, it determines whether the mapping of a particular set of SCs to one or more specific RCs, can be reverted by a corresponding mapping from the at least one RC to the original set of SCs. If the ES determines that the mappings are convergent, the mapping service will return a call 140 to the process 128. The call 140 identifies the at least one RC to which the object 104 should be assigned in the RS. In response to the call 140, the object is so assigned. The object may then be passed, as indicated by an arrow 141, to the RS where it can be worked upon using the application 120, to name just one example. The object 104 can later be passed back to the SS using the second PM in an analogous way.

If, on the other hand, the ES determines that the first and second PMs are not convergent, a rule-based reassignment algorithm (RBRA) 142 may be executed. The purpose of the RBRA is to reassign the object 104 to at least one other RCs, repeatedly if necessary, until there is found one or more RCs that provide a convergent mapping. Some examples of this will now be described.

Figure 2:
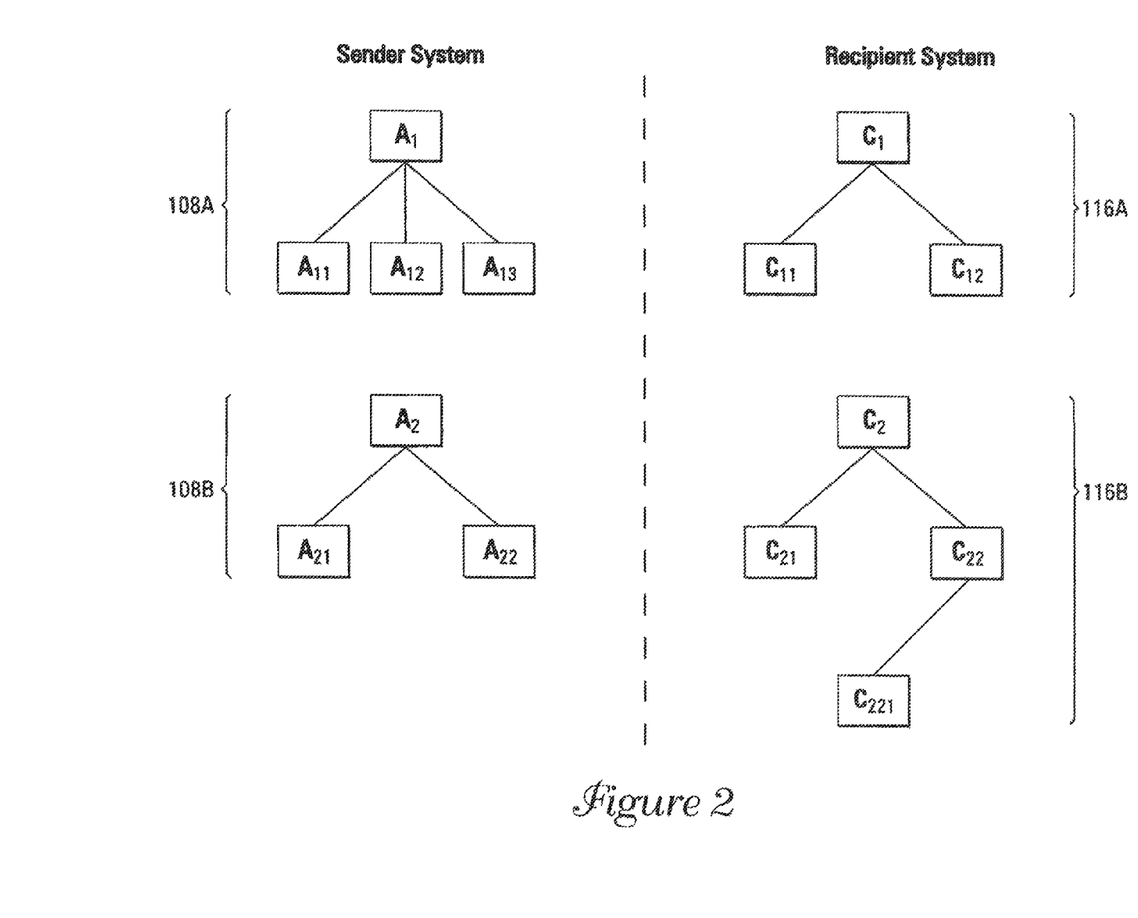
FIG. 2 shows category hierarchies in sender and recipient systems.

FIG. 2 shows category hierarchies in the respective sender and recipient systems. Accordingly, the first PM can be visualized as going from left to right in this figure, and the second PM similarly as going from right to left. The SS may include a first SCH 108A and a second SCH 108B. The SCH 108A may include a categorization $A_1$ that has specializations $A_{11}$, $A_{12}$ and $A_{13}$. Similarly, the SCH 108B may include a categorization $A_2$ that has specializations $A_{21}$ and $A_{22}$. The RS may include a first RCH 116A and a second SCH 116B. The RCH 116A may include a categorization $C_1$ that has specializations $C_{11}$ and $C_{12}$. Similarly, the RCH 116B may include a categorization $C_2$ that has specializations $C_{21}$ and $C_{22}$. The specialization $C_{22}$, in turn, may have a specialization $C_{221}$. In this example, the SCHs 108A and B and the RCH 116A are two-level hierarchies, and the RCH 116B is an example of a three-level hierarchy. In other implementations, hierarchies may have many more levels.

A first example involves an object-specific categorization. Assume that the object 104 is assigned to the category $A_{11}$ and that the first PM maps this category to the category $C_1$. If, however, the particular object 104 is specifically associated with the category $C_{11}$ (that is, an object-specific categorization), and if the category $C_{11}$ is a specialization of the mapped category $C_1$, then the object-specific categorization will override the mapping. Accordingly, the object will be assigned to the category $C_{11}$.

In a second example, the category $A_2$ has no defined mapping target. That is, the first PM maps the category $A_2$ to the empty set. However, there may exist viable mappings for one or more specializations of the category $A_2$. The RBRA may therefore contain executable instructions for determining whether the second PM includes a mapping to a specialization of the category $A_2$. Assume that the second PM maps the category $C_{11}$ to $A_{21}$ and the category $C_{12}$ to $A_{22}$, respectively. This means there is a viable RS to SS mapping that points to specializations of the target-less category $A_2$. Accordingly, the RBRA may instruct that the category $A_2$ be mapped to both the categories $C_{11}$ and $C_{12}$, because the mapping will then be convergent in the sense that the reverse mapping leads to at least one specialization of the original category.

A third example involves a mapping to two categories at different levels of the same hierarchy. Assume, for example, that the first PM maps the category $A_2$ to the categories $C_{21}$ and $C_{221}$, which are at different levels of the RCH 116B. The RBRA can be configured to generalize or specialize the categorization in such a situation. That is, the RBRA may select a more general category of $C_{21}$ and $C_{221}$, or a less general category of and $C_{21}$ and $C_{221}$, based on its rules. In the exemplary RCH 116B, $C_{21}$ is the more general, and $C_{221}$ the less general, of the two categories.

A fourth example involves a mapping to several categories that are first-level specializations of a specific RC. Assume for example, that the first PM maps the category $A_{21}$ to the categories $C_{11}$ and $C_{12}$. In such a situation there is no way for the system to decide in which category the object properly belongs. For example, the system cannot determine whether the object is two-wheel drive or a four-wheel drive vehicle. The RBRA therefore may reassign the object to the common generalization of these two categories, in this case $C_1$.

A fifth example involves the existence of a labeled hierarchy that applies to the SS and to the RS. For example, systems sold by SAP AG may include a basis hierarchy that has a special meaning for objects in both systems. Because the category or categories belonging to the labeled hierarchy apply in both systems, they should not be modified by the RBRA. Assume, for example, that the first PM maps the category $A_1$ to the category $C_1$, which is part of the labeled hierarchy. It may then be ensured, through the configuration of the RBRA and the mapping service, that the object remains assigned to the category $C_1$ whether or not the RBRA is executed.

Figure 3:
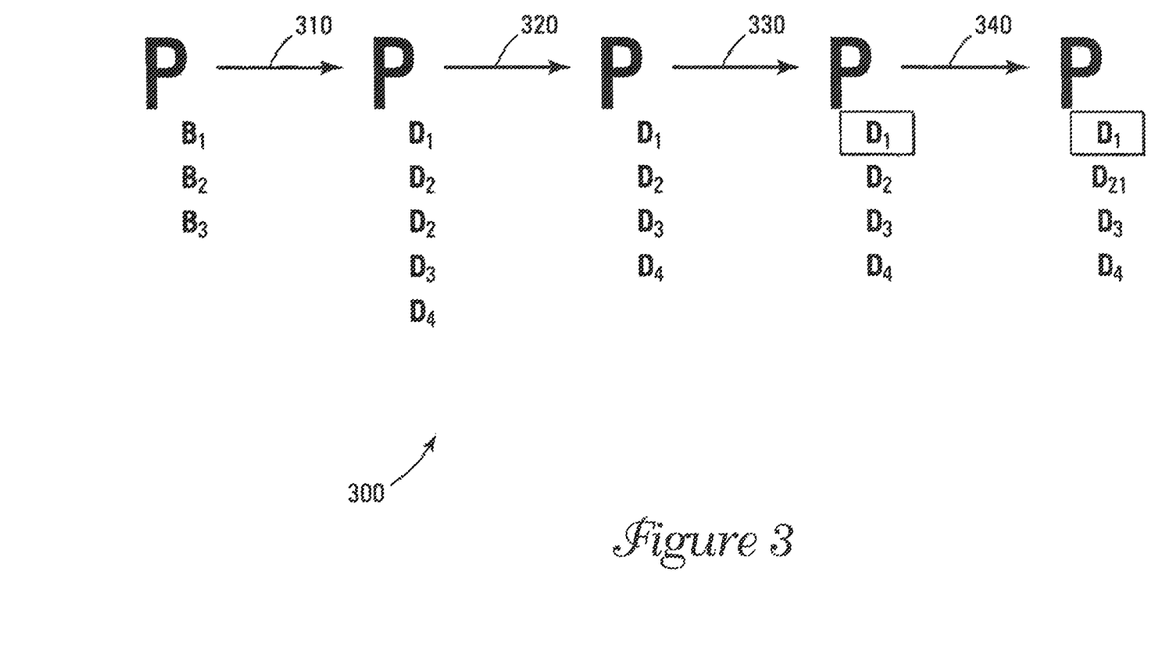
FIG. 3 schematically shows categories being assigned to an object.

An exemplary operation of the mapping service 132 will be described with reference also to FIG. 3. The mapping is illustrated by a sequence 300 that begins at the left and ends to the right. Here, the object represents a product and therefore is referred to as P. In the SS, the object is assigned to arbitrary categories $B_1$, $B_2$ and $B_3$ and the object is therefore initially labeled with these categories in the figure. Execution of the first PM is here represented by an arrow 310. This mapping creates five assignments of the object to categories in the RS. Particularly, the first PM creates category assignments $D_1$, $D_2$, $D_2$, $D_3$ and $D_4$ as illustrated by the new labeling.

A next arrow 320 of the sequence 300 corresponds to deleting duplicate assignments. That is, the system may determine whether there exists several assignments of the object to one of the RCs. Here, there are two assignments to the category $D_2$. Accordingly, all but one of the several duplicate assignments may be removed.

A next arrow 330 corresponds to identifying any assignment that relates to a labeled hierarchy. As described above, such assignments should not be changed by the RBRA. Here, the category $D_1$ belongs to a labeled hierarchy and its permanence is indicated by a box.

A next arrow 340 corresponds to applying the second PM to the mapped categories and, if there is not convergence, executing the RBRA. The RBRA will not reassign any "boxed" category, here $D_1$, but the other categories are subject to possible reassignment to improve convergence of the mapping. Execution of the RBRA may involve any or all of the five examples that were described earlier. After each reassignment, it is evaluated whether the mappings converge. If they do not, the RBRA may continue executing its reassignments. Here, the RBRA results in the category $D_2$ being replaced with the category $D_{21}$, which may for example be an object-specific specialization of the initially mapped category $D_2$. Upon arriving at a convergent mapping, the object is assigned to the proper RC or RCs, as the case may be, and passed to the RS as indicated by arrow 141 (FIG. 1).

The first and second PMs may be construed manually or automatically. For example, one can construe a matching algorithm that runs through the SCHs and the RCHs and delivers a proposal list with mapping targets, including a degree of concurrence for each target. The matching algorithm can evaluate one or more attributes of the respective categories to determine the degree of concurrence. For example, the algorithm can compare the descriptions (contained in description fields) of the respective categories and establish a percentage of similitude (0-100%) between them. Other attributes than description may be used. Also, categories with very high concurrence (i.e., close to 100%) can be automatically included as mapping targets, while categories with very low concurrence (i.e., close to 0%) can be automatically excluded as mapping targets. A user may thereafter review the remaining proposed mappings (that have intermediate concurrences) and select a target category for each such mapping.

Alternatively, a user may manually define any or all of the mapping blocks for the first and second PMs, for example using the SS. That is, the user can enter the name of a SC and of one or more RCs to which the SC should be mapped. This information can be stored such that it can be executed in the first PM, for example.

The system may determine whether the user entries conform with specified standards for the mapping blocks. For example, the system can do any or all of the following:

1) ensure that the mapping block maps a category on at most one category of each hierarchy in the RS;

2) ensure that a category of a labeled hierarchy is mapped on a category of a labeled hierarchy:

3) ensure that a category of a non-labeled hierarchy is not mapped on a category of a labeled hierarchy;

4) ensure that when the first PM includes a mapping from a SC to a RC, the second PM includes at least one of: a) a mapping from the RC to the SC and b) a mapping from the RC to a specialization category of the SC;

5) ensure that related mappings stay within remain with the same category. For example, assume that the first PM includes a mapping from a SC to a RC, that the SC has a specialization category and that there are several RCHs. The system may ensure that the first PM does not map the specialization category and the SC to different ones of the several RCHs; and 6) ensure that mappings are linear. For example, applying the first PM to two objects being assigned to different SCs should result in these respective objects being assigned to a set of RCs that is the same as if the first PM had been applied to a single object assigned to those SCs.

The FIG. 1 example involved an object corresponding to a specific truck. In other implementations, an object can correspond to any other item or tangible, such as a product, technical asset, employee, contact or a partner. Also, a category can correspond to a grouping of characteristics for the object, such as properties of a person or an item.

Figure 4:
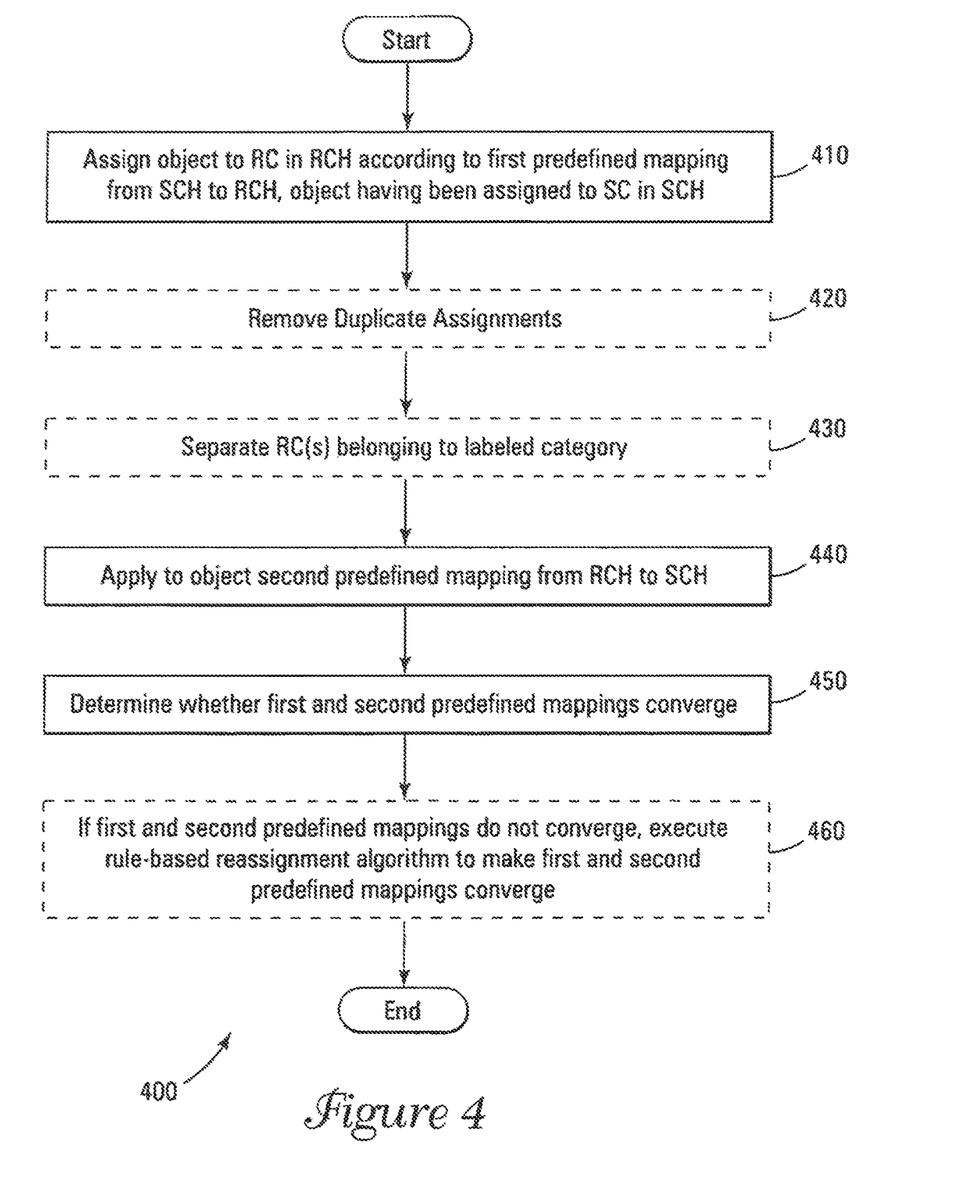
FIG. 4 is a flow chart of an embodiment of an inventive method.

FIG. 4 is a flow chart of a method 400. The method 400 may be performed in the ES 122. For example, a computer program product may include instructions that cause a processor to perform operations comprising the steps of the method 400. The method 400 includes the following steps:

Assigning, in step 410, an object to at least one recipient category in a recipient category hierarchy according to a first predefined mapping from a sender category hierarchy to the recipient category hierarchy. The object is assigned to a sender category in the sender category hierarchy. For example, arrow 310 in FIG. 3 corresponds to the product being assigned to RCs in a RCH, the product initially being assigned to SCs in a SCH.

Removing duplicate assignments in optional step 420. For example, arrow 320 corresponds to the duplicate $D_2$ assignment being removed.

Separating, in optional step 430, RC(s) belonging to a labeled category. For example, arrow 330 corresponds to identifying and labeling the assignment to $D_1$, which category belongs to a labeled hierarchy. The identified assignment will not be changed by the RBRA.

Applying to the object, in step 440, a second predefined mapping from the recipient category hierarchy to the sender category hierarchy. For example, arrow 340 corresponds to applying the second PM to the mapped categories.

Determining, in step 450, whether the first and second predefined mappings converge. For example, arrow 340 corresponds in part to determining whether the first and second PMs converge.

If the first and second predefined mappings do not converge, executing, in optional step 460, a rule-based reassignment algorithm to make the first and second predefined mappings converge. For example, arrow 340 corresponds in part to executing the RBRA if the first and second PM do not converge.

Figure 5:
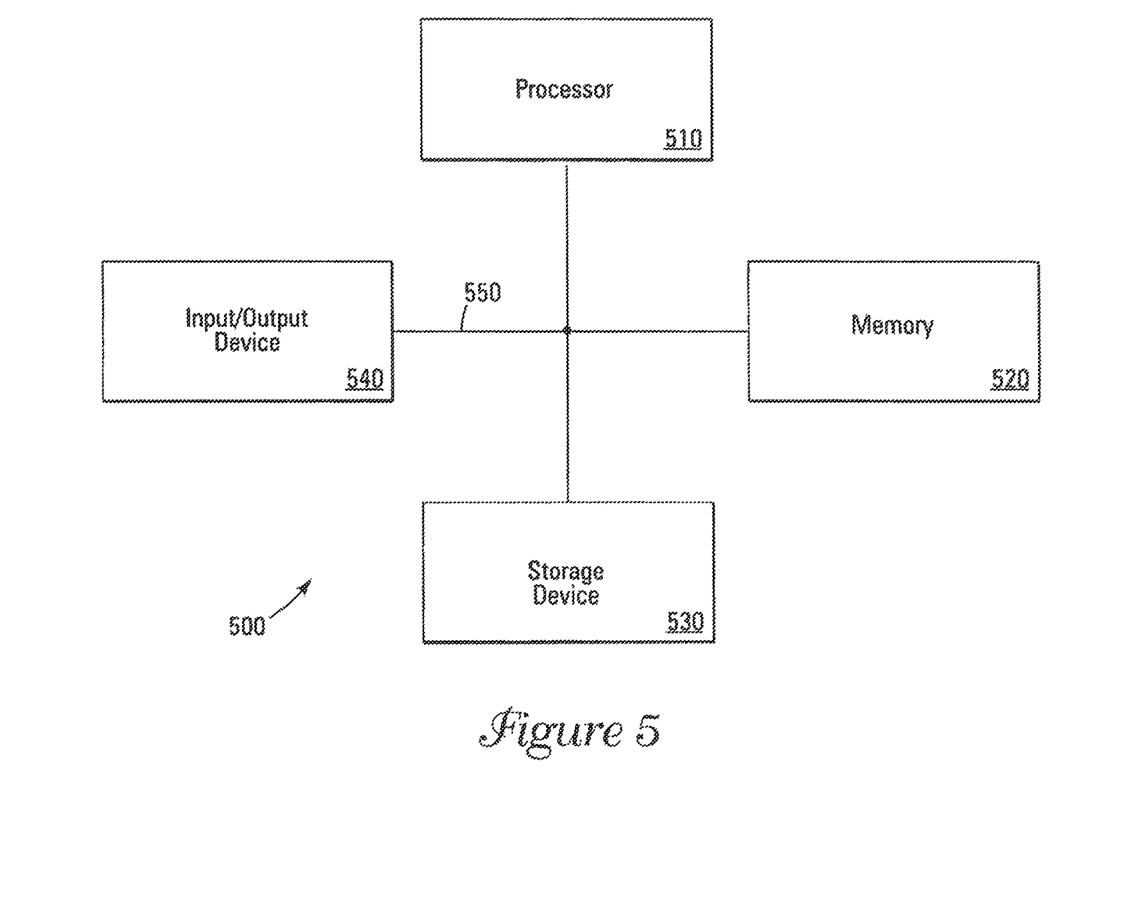
FIG. 5 shows a block diagram of a general computer system.

FIG. 5 is a block diagram of a computer system 500 that can be used in the operations described above, according to one embodiment. The system 500 includes a processor 510, a memory 520, a storage device 530 and an input/output device 540. Each of the components 510, 520, 530 and 540 are interconnected using a system bus 550. The processor 510 is capable of processing instructions for execution within the system 500. In one embodiment, the processor 510 is a single-threaded processor. In another embodiment, the processor 510 is a multi-threaded processor. The processor 510 is capable of processing instructions stored in the memory 520 or on the storage device 530 to display graphical information for a user interface on the input/output device 540.

The memory 520 stores information within the system 500. In one embodiment, the memory 520 is a computer-readable medium. In one embodiment, the memory 520 is a volatile memory unit. In another embodiment, the memory 520 is a non-volatile memory unit.

The storage device 530 is capable of providing mass storage for the system 500. In one embodiment, the storage device 530 is a computer-readable medium. In various different embodiments, the storage device 530 may be a floppy disk device, a hard disk device, an optical disk device, or a tape device.

The input/output device 540 provides input/output operations for the system 500. In one embodiment, the input/output device 540 includes a keyboard and/or pointing device. In some embodiments, the input/output device 540 includes a display unit for displaying graphical user interfaces. For example, the input/output device 540 may display suitable views or representations of objects, categories and hierarchies.

The invention can be implemented in digital electronic circuitry, or in computer hardware, firmware, software, or in combinations of them. Apparatus of the invention can be implemented in a computer program product tangibly embodied in an information carrier, e.g., in a machine-readable storage device or in a propagated signal, for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits). To provide for interaction with a user, the invention can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The invention can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of embodiments of the invention have been described. Nevertheless, it will be understood that various modifications may be made without departing from the spirit and scope of the invention. Accordingly, other embodiments are within the scope of the following claims.

What is claimed is:

1. A method comprising:
receiving a data object from a sender computer system via an electronic communication, the data object being assigned to a first category of a sender category hierarchy stored in a memory of the sender computer system;
identifying a first predefined mapping, the first predefined mapping including a mapping of the first category of the sender category hierarchy to a first category of a recipient category hierarchy stored in a memory of a recipient computer system, categories of the sender category hierarchy being different from categories of the recipient category hierarchy;
identifying a second predefined mapping, the second predefined mapping including a mapping of the first category of the recipient category hierarchy to a second category of the sender category hierarchy;
based on the first category of the sender category hierarchy being different from the second category of the sender category hierarchy:
identifying a second category of the recipient category hierarchy, the second category of the recipient category hierarchy having a predefined mapping from the second category of the recipient category hierarchy to the first category of the sender category hierarchy, the identifying of the second category of the recipient category hierarchy based on repeatedly reassigning the data object to categories of the recipient category hierarchy until a convergent mapping is found;
overriding the first predefined mapping to assign the object to the second category of the recipient system to assign the data object to the second category of the recipient category hierarchy instead of the first category of the recipient category hierarchy; and
sending the data object to the recipient computer system via an additional electronic communication.

2. The method of claim 1, wherein the identifying of the second category of the recipient category hierarchy includes identifying that the second category is a specialization of the category of the first recipient category hierarchy that is specific to the object.

3. The method of claim 1, wherein the identifying of the second category of the recipient category hierarchy includes identifying that the second category of the recipient category hierarchy has a predefined mapping to a specialization of the first category of the sender category hierarchy.

4. The method of claim 1, further comprising:
identifying a third predefined mapping, the third predefined mapping including a mapping of the first category of the sender category hierarchy to a third category of the recipient category hierarchy, the second category of the recipient category hierarchy being less general than the category of the recipient category hierarchy; and
wherein the identifying of the second category of the recipient category includes selecting the second category of the recipient category over the third category of the recipient category hierarchy based on a rule.

5. The method of claim 1, further comprising:
determining a third predefined mapping, the third predefined mapping including a mapping of the first category of the sender category hierarchy to a third category of the recipient category hierarchy; and
wherein the identifying of the second category of the recipient category includes selecting the second category of the recipient category based on the second category of the recipient category being a common generalization of the first category of the recipient category and the third category of the recipient category.

6. The method of claim 1, wherein the overriding of the first predefined mapping is based on a determination that the first category of the recipient category hierarchy does not belong to a basis hierarchy.

7. A system comprising:
an exchange computer system comprising one or more specially-programmed modules implemented by one or more processors, the one or more modules configured to:
receive a data object from a sender computer system via an electronic communication, the data object being assigned to a first category of a sender category hierarchy stored in a memory of the sender computer system;
identify a first predefined mapping, the first predefined mapping including a mapping of the first category of the sender category hierarchy to a first category of a recipient category hierarchy stored in a memory of a recipient computer system, categories of the sender category hierarchy being different from categories of the recipient category hierarchy;
identify a second predefined mapping, the second predefined mapping including a mapping of the first category of the recipient category hierarchy to a second category of the sender category hierarchy;
based on the first category of the sender category hierarchy being different from the second category of the sender category hierarchy:
identify a second category of the recipient category hierarchy, the second category of the recipient category hierarchy having a predefined mapping from the second category of the recipient category hierarchy to the first category of the sender category hierarchy, the identifying of the second category of the recipient category hierarchy based on repeatedly reassigning the data object to categories of the recipient category hierarchy until a convergent mapping is found;

overriding the first predefined mapping to assign the object to the second category of the recipient system to assign the data object to the second category of the recipient category hierarchy instead of the first category of the recipient category hierarchy; and send the data object to the recipient computer system via an additional electronic communication.

8. The system of claim 7, wherein the identifying of the second category of the recipient category hierarchy includes identifying that the second category is a specialization of the category of the first recipient category hierarchy that is specific to the object.

9. The system of claim 7, wherein the identifying of the second category of the recipient category hierarchy includes identifying that the second category of the recipient category hierarchy has a predefined mapping to a specialization of the first category of the sender category hierarchy.

10. The system of claim 7, further comprising:
identifying a third predefined mapping, the third predefined mapping including a mapping of the first category of the sender category hierarchy to a third category of the recipient category hierarchy, the second category of the recipient category hierarchy being less general than the category of the recipient category hierarchy; and
wherein the identifying of the second category of the recipient category includes selecting the second category of the recipient category over the third category of the recipient category hierarchy based on a rule.

11. The system of claim 7, further comprising:
determining a third predefined mapping, the third predefined mapping including a mapping of the first category of the sender category hierarchy to a third category of the recipient category hierarchy; and
wherein the identifying of the second category of the recipient category includes selecting the second category of the recipient category based on the second category of the recipient category being a common generalization of the first category of the recipient category and the third category of the recipient category.

12. The system of claim 7, wherein the overriding of the first predefined mapping is based on a determination that the first category of the recipient category hierarchy does not belong to a basis hierarchy.

13. The system of claim 7, wherein the sending of the data object to the recipient system corresponds with a relocating of a technical asset from a first geographical region corresponding to the sending computer system to a second geographical region corresponding to the recipient computer system.

14. A non-transitory computer-readable storage medium storing instructions thereon, which, when executed by one or more processors, cause the one or more processors to perform operations, the operations comprising:
receiving a data object from a sender computer system via an electronic communication, the data object being assigned to a first category stored in a memory of a sender category hierarchy of the sender computer system;
identifying a first predefined mapping, the first predefined mapping including a mapping of the first category of the sender category hierarchy to a first category of a recipient category hierarchy stored in a memory of a recipient computer system, categories of the sender category hierarchy being different from categories of the recipient category hierarchy;

identifying a second predefined mapping, the second predefined mapping including a mapping of the first category of the recipient category hierarchy to a second category of the sender category hierarchy;

based on the first category of the sender category hierarchy being different from the second category of the sender category hierarchy:
identifying a second category of the recipient category hierarchy, the second category of the recipient category hierarchy having a predefined mapping from the second category of the recipient category hierarchy to the first category of the sender category hierarchy, the identifying of the second category of the recipient category hierarchy based on repeatedly reassigning the data object to categories of the recipient category hierarchy until a convergent mapping is found;

overriding the first predefined mapping to assign the object to the second category of the recipient system to assign the data object to the second category of the recipient category hierarchy instead of the first category of the recipient category hierarchy; and sending the data object to the recipient computer system via an additional electronic communication.

15. The non-transitory computer-readable storage medium of claim 14, wherein the identifying of the second category of the recipient category hierarchy includes identifying that the second category is a specialization of the category of the first recipient category hierarchy that is specific to the object.

16. The non-transitory computer-readable storage medium of claim 14, wherein the identifying of the second category of the recipient category hierarchy includes identifying that the second category of the recipient category hierarchy has a predefined mapping to a specialization of the first category of the sender category hierarchy.

17. The non-transitory computer-readable storage medium of claim 14, further comprising:
identifying a third predefined mapping, the third predefined mapping including a mapping of the first category of the sender category hierarchy to a third category of the recipient category hierarchy, the second category of the recipient category hierarchy being less general than the category of the recipient category hierarchy; and
wherein the identifying of the second category of the recipient category includes selecting the second category of the recipient category over the third category of the recipient category hierarchy based on a rule.

18. The non-transitory computer-readable storage medium of claim 14, further comprising:
determining a third predefined mapping, the third predefined mapping including a mapping of the first category of the sender category hierarchy to a third category of the recipient category hierarchy; and
wherein the identifying of the second category of the recipient category includes selecting the second category of the recipient category based on the second category of the recipient category being a common generalization of the first category of the recipient category and the third category of the recipient category.

19. The non-transitory computer-readable storage medium of claim 14, wherein the overriding of the first predefined mapping is based on a determination that the first category of the recipient category hierarchy does not belong to a basis hierarchy.

* * * * *